(12) United States Patent
Le Leannec et al.

(10) Patent No.: US 8,009,735 B2
(45) Date of Patent: Aug. 30, 2011

(54) METHOD AND DEVICE FOR TRANSMITTING AND RECEIVING IMAGE SEQUENCES BETWEEN A SERVER AND CLIENT

(75) Inventors: Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1520 days.

(21) Appl. No.: 11/398,101

(22) Filed: Apr. 4, 2006

(65) Prior Publication Data

US 2006/0262345 A1    Nov. 23, 2006

(30) Foreign Application Priority Data

Apr. 4, 2005 (FR) ..................... 05 03298

(51) Int. Cl.
*H04N 7/12* (2006.01)
(52) U.S. Cl. .......... 375/240.16; 375/240.01; 375/240.12
(58) Field of Classification Search .......... 375/240, 375/240.01, 240.12, 240.16; 382/232, 240
See application file for complete search history.

(56) References Cited

U.S. PATENT DOCUMENTS

| | | | | |
|---|---|---|---|---|
| 5,684,715 A | | 11/1997 | Palmer | 364/514 C |
| 6,212,237 B1 * | | 4/2001 | Minami et al. | 375/240.16 |
| 7,095,786 B1 * | | 8/2006 | Schonfeld et al. | 375/240.16 |
| 7,116,833 B2 * | | 10/2006 | Brower et al. | 382/240 |
| 7,298,909 B2 * | | 11/2007 | Ishikawa | 382/232 |
| 7,330,596 B2 * | | 2/2008 | Suino et al. | 382/240 |
| 2002/0021353 A1 | | 2/2002 | DeNies | 348/36 |
| 2003/0197720 A1 | | 10/2003 | Moon et al. | 345/716 |
| 2003/0229901 A1 | | 12/2003 | Amir et al. | 725/95 |
| 2004/0039810 A1 | | 2/2004 | Donescu et al. | 709/223 |
| 2004/0136598 A1 | | 7/2004 | Le Leannec et al. | 382/232 |
| 2006/0184607 A1 | | 8/2006 | Le Leannec et al. | 709/203 |

FOREIGN PATENT DOCUMENTS

EP    1 261 210 A2    11/2002

OTHER PUBLICATIONS

Information Technology—JPEG2000 image coding system—Part 9: Interactivity tools, APIs and protocols—Common Text Publication, UTI-T Rec. T.808 ISO/IEC 15444-9:2004, Jul. 2004.

(Continued)

*Primary Examiner* — Allen Wong
(74) *Attorney, Agent, or Firm* — Fitzpatrick, Cella, Harper & Scinto

(57) ABSTRACT

The present invention concerns a method and device for transmitting images of a sequence of digital images between a server device and a client device connected by a communication network, the images being coded in a format allowing access to spatial sub-parts. The method comprises a prior step of receiving a follow request specifying a spatial area of an image in the sequence previously received by the client device, and steps of:
  determining the following image in the sequence of images to be sent to the client device
  determining a spatial area in the following image to be sent, corresponding to the specified area, according to the estimated movement in the sequence of images, and
  sending to the client device at least some of the image data of the area thus determined.

The invention also concerns a method and device for receiving images transmitted according to this transmission method.

23 Claims, 7 Drawing Sheets

OTHER PUBLICATIONS

Islam, A., et al., "*JPEG2000 For Wireless Applications*," Proceedings of the SPIE, SPIE, Bellingham, VA, USA, vol. 5203 (2003), pp. 255-271, XP-002316046.

Taubman, D., et al., "*Architecture, Philosophy and Performance of JPIP: Internet Protocal Standard for JPEG2000*," International Symposium on Visual Communications and Image Processing (Jul. 2003), pp. 1-15, XP-002260546.

Gormish, M. J., et al., "*JPEG2000: Overview, Architecture, and Applications*," Image Processing, 2000 Proceedings International Conference (Sep. 2000), Piscataway, NY, USA, IEEE, vol. 2, pp. 29-32, XP-010529915.

"JPEG2000 Part 3 Final Draft International Standard", ISO/IEC JTC1/SC29 WG1 N2250, Sep. 2001.

\* cited by examiner

METHOD AND DEVICE FOR TRANSMITTING AND RECEIVING IMAGE SEQUENCES BETWEEN A SERVER AND CLIENT

The present invention concerns a method and device for transmitting and receiving digital video, in particular the transmission and reception of spatial sub-parts of a digital video.

The invention is situated in the technical field of the communication of data in a sequence of images between a server and a client, and applies particularly when the format of the images in the sequence is a coding format allowing access to spatial sub-parts of the images in the sequence, such as for example the standardized format Motion-JPEG2000 ("JPEG2000 Part 3 Final Draft International Standard", ISO/IEC JTC1/SC29 WG1 N2250, September 2001).

This is because such a format associated with an appropriate communication protocol allows the development of novel interactive applications for the display of sequences of images, in particular enabling a user to navigate spatially in the video sequences, for example by demanding a forward zoom or a backward zoom or a spatial movement, and to increase or reduce the size of the images displayed or the display frequency.

In particular, by virtue of such a coding format, a user can specify a display window with a smaller size than the size of the full-resolution image. This is particularly advantageous when the client receives images from a high-definition fixed camera for taking high-resolution images, in an application of the video surveillance type for example.

It would be advantageous, in particular in this context, to enable the client to follow an area of the image in real time according to its movement, without having to send a new specific request as soon as the object contained in this area has moved.

In the state of the art methods are known for following moving objects in a digital video. Patent application US20030197720 describes a method executed on video sequences which makes it possible to extract and follow objects in these sequences. On the server, prior to any transmission, objects in the video are extracted and movement vectors making it possible to following them throughout the sequence are calculated. These vectors are stored on the server, and transmitted to the client at the same time as all the image data. The client can then select one of these predefined objects and follow it throughout the sequence. However, for this it is necessary to have received all the compressed data and only the predetermined objects can be selected.

The method cited above does not therefore enable the user to select any object in the image and to receive only the data necessary for following this object in the sequence.

The objective of the present invention is to resolve this problem by proposing a method for automatically receiving a sub-part of the coded data corresponding to an area to be followed requested by the user.

To this end, the invention proposes a method of transmitting images in a sequence of digital images between a server device and a client device connected by a communication network, the images being coded according to a format allowing access to spatial sub-parts. This image transmission method is remarkable in that it comprises:

a prior step of receiving a follow request, specifying a spatial area to be followed belonging to an image in the sequence previously received by the client device, and steps of:

determining the following image in the sequence of images to be sent to client device determining a spatial area in said following image, corresponding to the specified area, according to the estimated movement in the sequence of images, and sending to the client device at least some of the image data of the area determined.

Thus the invention makes it possible to send to the client device only the data necessary for decoding and displaying the moving area requested by the client, without needing to re-encode the data. This makes it possible to reduce the bandwidth necessary for the transmission of the data and to more rapidly satisfy the request from the client. In addition, the user does not need to follow the moving area manually.

In an advantageous embodiment, the spatial area specified in the follow request is a rectangular area, defined by its size and position. Such an area can be specified by the user by means of his graphical interface and may be identical to the display window of the client device.

According to a preferred characteristic, the follow request contains a predefined field specifying at least the index of the image of the sequence to which the area to be followed belongs.

The addition of such a field makes it possible to indicate to the server in a simple and compact manner the request to follow an area by the user.

In addition, the follow request specifies the size and position of a rectangular display window corresponding to the size and position of the display window of the client device.

According to a first embodiment, the spatial area to be followed is identical to the display window of the client device. In this case, the coordinates of these two rectangular areas are identical and transmitted only once.

According to a second embodiment, the spatial area to be followed is included in the display window. In this case, the size and position of the spatial area to be followed are specified in the predefined field of the follow request.

When the area to be followed is included in the display window of the client device, the sending step also comprises the sending to the client device of supplementary image data corresponding to at least one vicinity of the spatial area determined in said following image to be sent. Thus, in the case where the area followed is strictly included in the display window of the client, but not exactly equal to this, the server automatically sends spatial parts uncovered by the movement of the area followed and which are necessary for completing the display.

In addition, the follow request specifies an interval of images in the sequence for which the following must be applied or a following time duration.

Thus the following and the set of images to which it must be applied are indicated to the server easily without additional communications.

According to a first embodiment, the estimated movement in the image sequence is represented by movement vectors on spatial blocks of predetermined size, calculated in advance and stored on the server device. This embodiment applies in the case of pre-recorded videos, also referred to as "video on demand" mode.

According to a second embodiment, the estimated movement in the image sequence is represented by movement vectors on spatial blocks with a size depending on the spatial area specified in the follow request, calculated at the time of the capture of the image sequence. This embodiment applies in the case of a "real time" transmission, in the context of a video surveillance application for example.

According to one characteristic, information on the size and/or position of the area determined is transmitted to the client device. In the preferred embodiment, the size and/or position information is transmitted in the form of metadata.

Correspondingly, the invention also concerns a device for transmitting images in a sequence of digital images between a server device and a client device connected by a communication network, the images being coded according to a format allowing access to spatial sub-parts. This device comprises:

means for receiving a follow request, specifying a spatial area belonging to an image in the sequence previously received by the client device, means for determining the following image to be sent in the image sequence, means for determining an area in the following image to be sent, corresponding to the specified area, according to the estimated movement in the image sequence, and means for sending to the client device at least some of the image data of the new area thus determined.

The image transmission device according to the invention comprises means for implementing the characteristics previously disclosed. This device has advantages similar to those of the associated method of transmitting images in a sequence of digital images.

According to another aspect, the invention also concerns a method for the reception by a client device of images in a sequence of images coming from a server device, the images being coded according to a format allowing access to spatial sub-parts. This reception method comprises a prior step of formulating a follow request, specifying a spatial area to be followed belonging to an image previously received in the sequence of images and steps of:

obtaining at least one item of information on the position of an area of the following image to be received, said area corresponding to the area to be followed according to the estimated movement in the image sequence, receiving at least some of the image data of said area.

This reception method thus makes it possible to receive an image area which is followed in the sequence according to the movement of the objects contained in this area. This method is particularly advantageous, since the positioning coordinates of the new area in each image in the sequence are transmitted by the server, as well as the data which make it up. Thus the client device can implement the following of a moving area without intervention from the user.

According to a preferred characteristic, the method also comprises, after the reception step, the steps of:

updating a display window according to the position information decoding the image data received, and displaying the decoded image data in said display window.

Thus the user will be able to follow and display the area containing one or more moving objects that he has defined in the prior follow request in the image sequence, without having to make other requests.

According to one embodiment, the formulation step comprises the insertion of a predefined field in said follow request, the predefined field specifying the index of the image containing the area to be followed.

Thus, by virtue of the use of a predefined field in the request, the follow request is made easily and without requiring other calculation or communication resources over and above a conventional request.

According to a particularly advantageous embodiment, the obtaining of at least one item of position information on the new area consists of the reception of said information in a metadata field. Thus this information is transmitted by adding information in an already existing transmission protocol.

Correspondingly, the invention also concerns a device for the reception by a client device of images in a sequence of images coming from a server device, the images being coded according to a format allowing access to spatial sub-parts. This device comprises:

means for formulating a request specifying a spatial area to be followed belonging to a previous image in the sequence of images means for obtaining at least one item of position information on an area of the following image to be received, said area corresponding to the area to be followed according to the estimated movement in the image sequence means for receiving at least some of the image data of said area.

The device for receiving images in a sequence of images according to the invention comprises means for implementing the characteristics of the reception method previously disclosed. This device has advantages similar to those of the reception method according to the invention.

The characteristics of the transmission and reception methods and devices according to the invention cited above have particular advantages in the case where the coding format of the image sequence is the Motion-JPEG2000 format and the transmission protocol is JPIP (JPEG2000 Interactive Protocol, described in Part 9 of the standard "Information technology—JPEG2000 image coding system—Part 9: Interactivity tools, APIs and protocols—Common Text Publication", UTI-T Rec. T.808 ISO/IEC 15444-9:2004, July 2004).

A computer program that can be read by a microprocessor comprises portions of software code adapted to implement the transmission method and reception method according to the invention, when it is loaded into and executed by the microprocessor.

An information storage means, possibly totally or partially removable, that can be read by a computer system, comprises instructions for a computer program adapted to implement the transmission and reception method according to the invention when this program is loaded into and executed by the computer system.

The information storage means and computer program have characteristics and advantages similar to the methods that they implement.

Other particularities and advantages of the invention will also emerge from the following description, illustrated by the accompanying drawings, in which.

The invention will be described, in the following examples, on sequences of images which are coded in the Motion-JPEG2000 compression format and which are exchanged between the server and client using the JPIP protocol. According to the Motion-JPEG2000 format, all the images in an image sequence are coded independently in JPEG2000 format. The JPEG2000 format allows access to various resolution and quality levels of spatial sub-parts of the images, in particular by virtue of the division of the images into spatio-frequency blocks referred to as codeblocks and grouped together in sets of blocks, referred to as precincts, representing a rectangular spatial area in a given resolution level.

It should be noted however that this case is an example, and that any other video coding format allowing access to spatial sub-parts of any images in the sequence could be applied similarly, using an appropriate transmission protocol.

Figure 1:
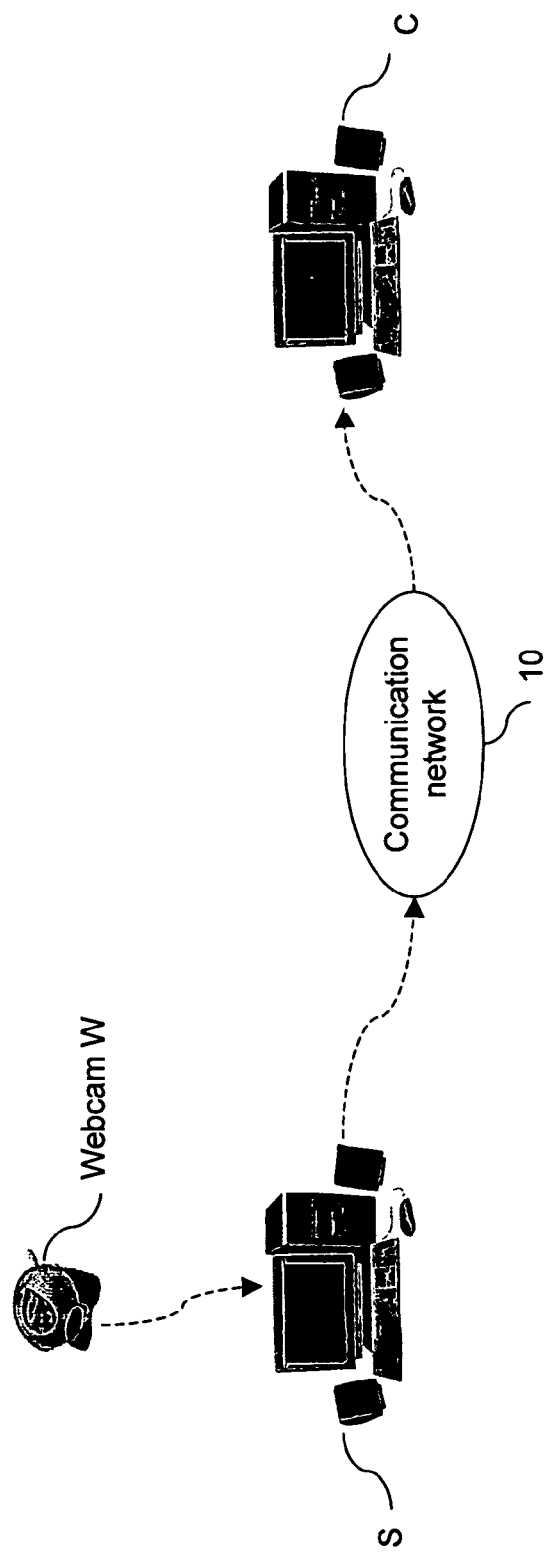
FIG. 1 depicts schematically a communication network adapted to implement the invention.

FIG. 1 depicts schematically a typical applicative context of the present invention. A video acquisition source, such as for example a Webcam, is connected to a server device S. The server device performs a coding, for example in Motion-JPEG2000 compression format, of the video sequence acquired, using specific software or a card dedicated to this purpose. A favored application envisaged is video surveillance. The video is acquired continuously. It can be compressed and stored on the server device, or then compressed and transmitted only following a request from at least one client device connected to the network.

The compressed video flow thus obtained can then be transmitted to one or more clients C, by means of the communication network 10, for example the Internet. When the compression format used is the Motion-JPEG2000 format, the JPIP protocol can advantageously be used to carry out the progressive transmission of the video data from the server to a client machine.

In the favored embodiment of the invention, each client machine C has interactive display software for the Motion-JPEG2000 video sequences.

Figure 2:
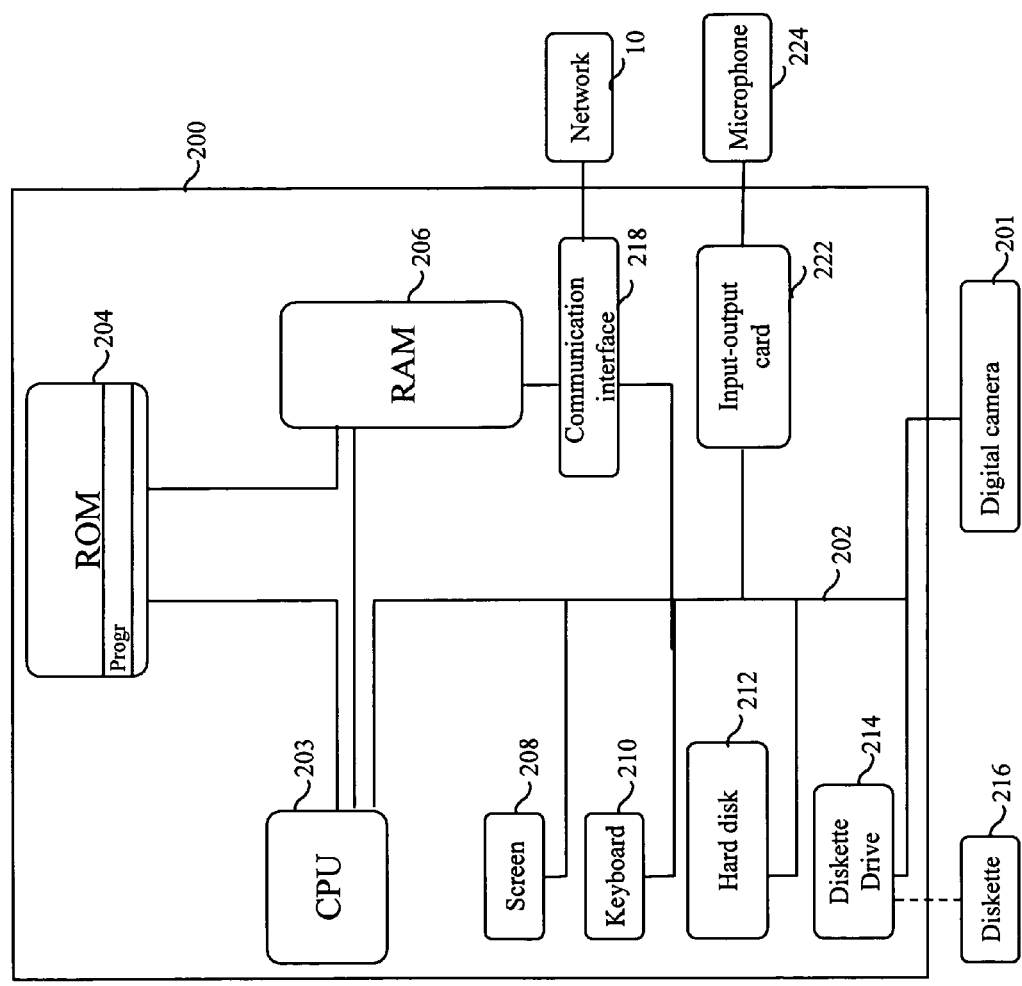
FIG. 2 depicts schematically a device adapted to implement the invention.

With reference to FIG. 2, a description will now be given of a device able to implement the method of the invention, whether it is a case of a server device S or a client device C. Such an apparatus is for example a microcomputer 200 connected to various peripherals, for example a digital camera 201 connected to a graphics card and supplying information to be processed according to the invention.

The device 200 comprises a communication interface 218 connected to the communication network 10 able to transmit coded/decoded digital data processed by the device. The device 200 also comprises a storage means 212 such as for example a hard disk. It also comprises a drive 214 for a disk 216. This disk 216 may be a diskette, a CD-ROM or a DVD-ROM for example. The disk 216, like the disk 212, can contain data processed according to the invention as well as the program or programs implementing the invention which, once read by the device 200, will be stored on the hard disk 212. According to a variant, the program Progr enabling the device to implement the invention can be stored in read only memory 204 (referred to as ROM in the drawing). In a second variant, the program can be received in order to be stored in an identical fashion to that described above, by means of the communication network 10.

This same device has a screen 208 for displaying in particular the decompressed data on the client device or serving as an interface with the user, who can thus parameterize the interactive navigation (for example selection of spatial area, forward zoom mode, backward zoom mode, "follow" mode), using the keyboard 210 or any other pointing means, such as a mouse 211, an optical pen or a touch screen.

The central unit 203 (referred to as CPU in the drawing) executes the instructions relating to the implementation of the invention, instructions stored in the read only memory 204 or in the other storage elements. On powering up, the processing programs stored in a non-volatile memory, for example the ROM 204, are transferred into the random access memory RAM 206, which will then contain the executable code of the invention as well as registers for storing the variables necessary for implementing the invention.

In more general terms, an information storage means that can be read by a computer or a microprocessor, integrated or not into the device, possibly removable, stores a program implementing the method according to the invention.

The communication bus 202 affords communication between the various elements included in the microcomputer 200 or connected to it. The representation of the bus 202 is not limiting and in particular the central unit 203 is able to communicate instructions to any element of the microcomputer 200 directly or by means of another element of the microcomputer 200.

Figure 3:
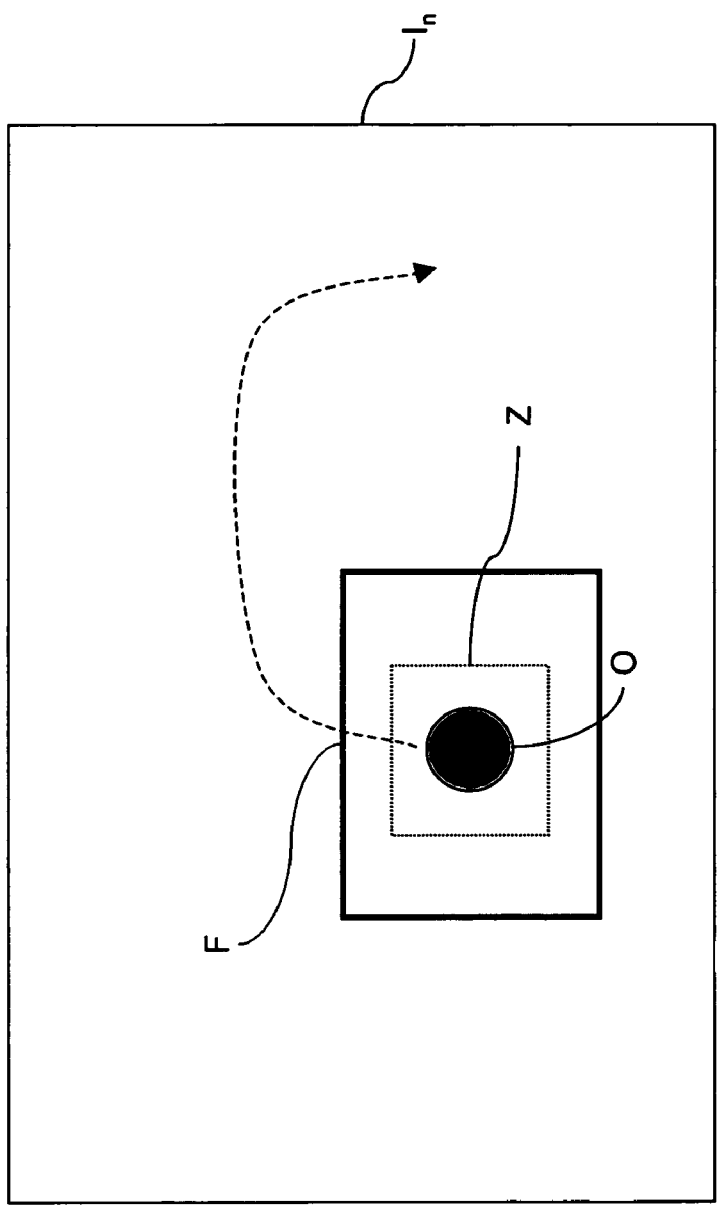
FIG. 3 depicts schematically an image displayed on the client device.

FIG. 3 shows schematically the functionality proposed by the invention. This figure gives an example of an image in the sequence of images, denoted $I_n$, of high resolution, at least part of which is displayed at a given moment on the screen 208 of the client machine. It is a high-resolution image, and the video scene depicts a moving object, denoted O, changing, following the path shown diagrammatically by a dotted line, on a fixed background. In this example, the display window of the client machine, denoted F, is spatially smaller than the size of the full-resolution image. In this case, the user displaying the image sequence may require display of the moving object with a maximum resolution rather than display of the scene in its entirety at reduced resolution. To do this he must, in the existing interactive navigation applications in videos in Motion-JPEG2000 format, manually move its display window, using the keyboard 210 or mouse 211, in order to following the moving object.

The present invention proposes to automate this process, by offering the user the possibility of selecting an area to be followed Z, encompassing the moving object of interest and to specify a "follow" mode, via a button on its graphical interface, able to be activated by the mouse 211 or keyboard 210 for example. The size and position of the rectangular area to be followed in the image $I_n$ are calculated automatically and sent to the server, according to the method of the invention.

Figure 4:
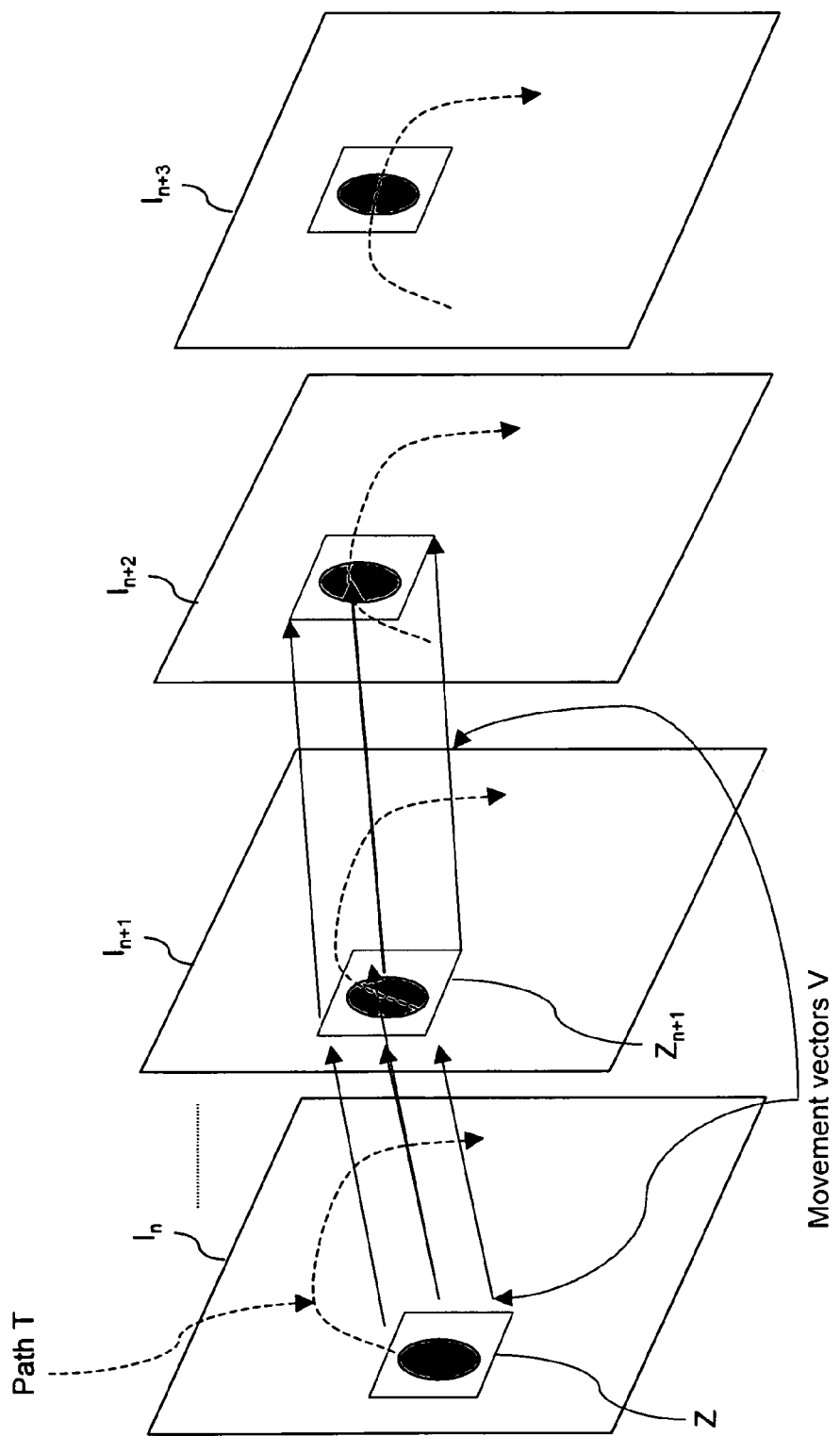
FIG. 4 depicts schematically the following of a moving area in several images of an image sequence.

In the preferred embodiment, the server is responsible for calculating and transmitting only the data corresponding to the area selected by the user, to be displayed in his display window. The coordinates and possibly the size of the area followed change over time, according to the path of the moving object in the sequence of images. This change is illustrated in FIG. 4, where four successive images in the sequence are shown, $I_n$ to $I_{n+3}$, and the path T of the object O followed which is inside the area Z specified in the client request.

The server implements a moving area following method, using, in the preferred embodiment, an algorithm for matching between images based on an estimation of movement by blocks (known by the term "block matching"). Such movement vectors V matching the area Z of the image $I_n$ and a new area $Z_{n+1}$ of the image $I_{n+1}$ are illustrated in FIG. 4. In this example, the average movement made by the area Z to be followed is evaluated assuming that the size of the area remains unchanged, which is adapted for a translation movement in a plane perpendicular to the plane of the camera. However, there exist algorithms for taking account of other types of movement, involving in particular the change in size of the area of interest.

Two embodiments will be distinguished hereinafter, described in detail below: the "real time" transmission mode, where the server has available in advance coordinates of the area to be followed at the time of compression, and the transmission mode of the type "video on demand", where the acquisition, compression and storage of the video sequences are made prior to any transmission. In the first "real time" mode, the matching is carried out on the images in the sequence after acquisition and before compression, and possibly according to the size and position of the area Z to be followed. In video on demand mode, the matching is preferably carried out in advance, on blocks of predetermined size, and the set of movement vectors obtained is stored in memory, preferably at the same time as the compressed sequence.

Figure 5:
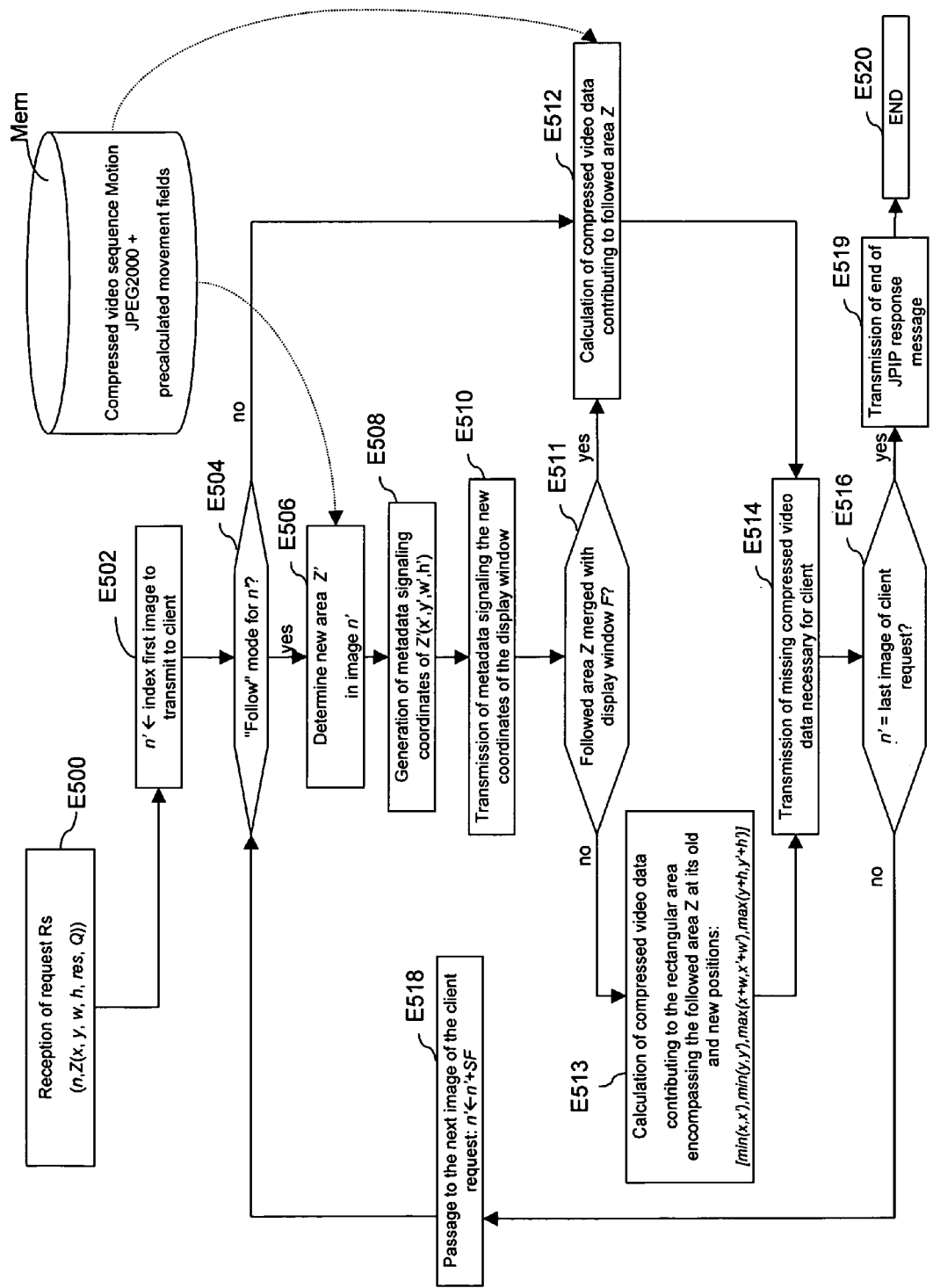
FIG. 5 depicts an example of a transmission algorithm according to the invention implemented by the server device.

FIG. 5 describes a use of the processing algorithm executed by the server, when a request of the follow type is received, specifying a spatial area to be followed according to the movement of the sequence.

In the "video on demand" embodiment, a set of movement vectors matching the images in the sequence is stored in a storage space Mem of the server device, on the hard disk 212 or on an external disk 216. Many algorithms for block matching between images are known. For example, it is possible to use a matching based on the minimization of the mean square error, on blocks of size 4×4 or 8×8, in order to have a fine estimation of the movement making it possible to adapt subsequently to the area to be followed.

Moreover, the server also has available, in the "video on demand" embodiment, all the images in the sequence, each image being individually coded in JPEG2000 format, in accordance with the Motion-JPEG2000 standard: each image is thus represented by a set of spatial resolutions, a set of quality levels or layers and a spatial partitioning of each resolution level into independently decodable rectangular areas referred to as precincts. In the example embodiment described here, these coded images are also stored in the storage space Mem.

The first step of the algorithm, E500, is the reception of a request of the "follow" type, denoted Rs, coming from the client device. The request Rs specifies the mode "follow" for an area Z defined, for example, by the spatial coordinates (x,y) of its top left hand corner in a predetermined reference frame, its height h and its width w, as well as its resolution res and its quality level Q. The request specifies the index "n" of the image in the sequence in which the area Z was selected. In practice, when the JPIP protocol is used for the communication of the coded data in Motion-JPEG2000 format, the "follow" mode is specified by an optional field, added for this purpose in the request, such as for example the mention "tracking=n" in the example below, where n represents the index of the image in which the area Z is specified. Finally, if the area followed is strictly included in the display window of the user, that is to say, $Z \subset F$ and $Z \neq F$, the field "tracking" also specifies the coordinates of the area followed Z.

An example of a request based on the "http" protocol (HyperText Transfer Protocol) will be given below with reference to FIG. 6.

Optionally, the request can also specify the image interval $[n,n_1]$ of the sequence for which the "follow" mode applies. In a variant, the request could specify a time period for which the "follow" mode must be applied. Finally, in another variant, the follow request does not specify any limit, and then the "follow" mode is invalidated only by the reception of a new request which does not specify the following of a spatial area or which specifies another area to be followed.

After reception of such a request Rs, the server selects the index n' of the first image to be transmitted to the client (step E502).

In the "video on demand" transmission mode, the index n' may for example be chosen as being the index of the image following the image specified in the request n'=n+SF, where SF is the time sub-sampling factor specified in the preferences of the client. This factor is deduced from the optional request fields "stream", "srate", and "drate", available in the JPIP protocol.

Alternatively, in the "real time" transmission mode, the acquisition and transmission of the images is continuous, and therefore the index n' must correspond to the next image to be sent by the server, which may be equal to n+D, where D corresponds to any delay.

At the following step E504, the algorithm checks that the "follow" mode does indeed apply for the image of index n', and therefore for example where the index n' is less than no in the case where an image interval $[n,n_1]$ is specified in the request.

If the response is negative, step E504 is followed by step E512, which will be described later. It is then a case of a known operating mode which is not the subject of the present invention.

In the case where the response is positive, step E504 is followed by step E506, which determines the new area Z' of the image $I_{n'}$ corresponding to the area Z of the image $I_n$ according to the movement in the video. As explained above with reference to FIG. 4, the movement vectors relating to the sequence are used.

In the "video on demand" embodiment, the vectors previously calculated and stored in memory are used. Alternatively, in "real time" mode, there is sought in the image $I_{n'}$ the rectangular area Z', for example with the same size as Z, having the greatest correlation with the area Z of the image $I_n$ without necessarily defining an associated movement vector.

In one or other of the embodiments, step E506 consists of determining a new area Z' matched with the area Z. According to a preferred embodiment, a principal movement vector is allocated to the area Z by producing a weighted mean on the coordinates of the movement vectors associated with the blocks of predetermined size included in Z. If all the vectors included in Z and matching a block $Z \subset I_n$ and another block of $I_{n'}$ are denoted $\{(V_1(a_1,b_1), V_2(a_2,b_2) \ldots V_K(a_K,b_K)\}$ it is possible to obtain a principal vector V' with the coordinates $$a' = \sum_{i=1}^{i=K} m_i a_i$$

$$b' = \sum_{i=1}^{K} m_i b_i$$

where the coefficients $m_i$ are weighting coefficients whose sum is equal to 1:

$$\sum_{i=1}^{K} m_i = 1.$$

Alternatively, a vector composed of the median values of the coordinates of the vectors $V_i$, can be allocated to the area Z, which would have the advantage of excluding the aberrant values (called "outliers").

Once this principal vector is obtained, it suffices to calculate the projection of the area Z in $I_n$ by the vector V' in order to obtain the coordinates of the area Z' in $I_{n'}$.

According to yet another alternative, the area Z' can be determined using the follow algorithm for a region of interest described in the patent FR02.09275.

It should be noted that, in the preferred embodiment, the matching is made between two consecutive images in the sequence of images, as illustrated in FIG. 3. The server device stores the coordinates of the area Z' determined and of the associated image index (n'), in order to use this information for the following image to be processed (n'+SF).

Alternatively, it can be envisaged that the movement vectors used for determining the area Z' match the images $I_n$ and $I_{n'}$, $I_n$ being the image specified in the request, in which the user has chosen the area to be followed. At the end of this step there are new coordinates (x',y') of the top left hand corner of the area Z' in the image of index n', and possibly its new size.

According to a variant where the follow algorithm is in a position to match rectangular areas of different sizes, it may happen that the size of the area followed increases or decreases significantly over time, for example if the object followed approaches or moves away from the shooting plane. In these cases, according to a particular embodiment of the invention, the server can decide to change the image display resolution level and then selects the resolution level which gives a followed area with a size closest to that of the display window F whose size remains fixed.

Next, the method makes provision for generating (step E508) binary response messages in JPIP format of the type "metadata-bin" (metadata), which encapsulate the new coordinates (position and size) of the area followed, making it possible to indicate to the client the size and position of the display window which he will have to display. New proprietary JPEG2000/JPIP metadata are defined for this purpose.

For example, a metadata box specifying the new coordinates of the area followed Z' may contain, in this order, the following fields:

| $L_{Box}$ | $T_{Box}$ | $XL_{Box}$ | x | y | w | h | res |
| --- | --- | --- | --- | --- | --- | --- | --- |

In accordance with the specification of the JPEG2000 metadata boxes, the fields $L_{Box}$ and $T_{Box}$ indicate respectively the length in bytes and the type of the box in question. In order to implement the present invention, a proprietary type "mobj" (moving object) is defined indicating that the box indicates the coordinates of a moving object. The optional field $XL_{Box}$ indicates the length of the box if the field $L_{Box}$ is equal to 1. In practice, it is not used for these boxes of the 'mobj' type. Finally, the fields x, y, w and h constitute the non-signed representation in 4 bytes of integers respectively equal to the x axis, the y axis, the width and the height of the rectangular area Z' constituting the area followed. It should be noted that the fields w and h are optional. If the value of $L_{Box}$ is equal to 16 bytes, then w and h are omitted. Otherwise $L_{Box}$ indicates a number of bytes equal to 24 and the values w and h appear in the box. The field res, also optional, indicates if necessary the new resolution level selected by the server, as explained above.

In the preferred embodiment illustrated here, these metadata are transmitted to the client at step E510, that is to say prior to the compressed data representing the portion of the image $I_{n'}$ to be transmitted, so that the client can update his display window for the current image of index n'. According to one variant it could be envisaged omitting the generation and sending of metadata containing the characteristics of the new area determined, leaving it to the client device to deduce by calculation the characteristics of the new area according to the data received (in particular according to the indices of the elementary JPEG2000 entities, referred to as precincts). The latter variant is however sub-optimal, since it involves calculations and a possible delay for the decoding and display of the data on the client device. In addition, the determination of the coordinates of the area followed by the client according to the latter approach would be approximate.

Figure 7:
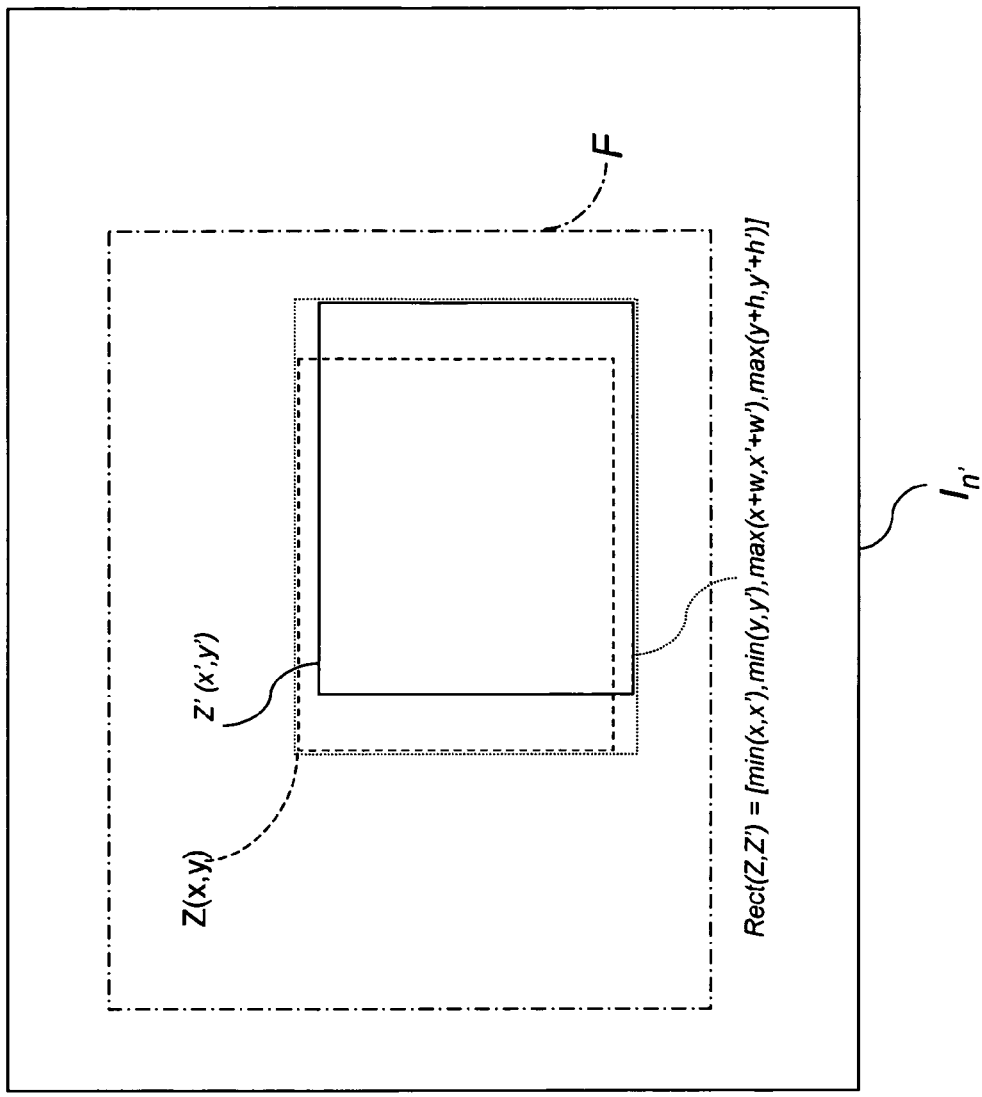
FIG. 7 illustrates the relative positions of the area followed before and after updating by the server.

The following step E511 makes provision for testing whether the area followed Z is identical to the display window of the user F. In the affirmative, the following step E512 is dedicated to the determination of the compressed video data in JPEG2000 format that the client is missing in order to be able to decode and display the new area Z', which also constitutes the new display window of the user. In the negative, step E513 calculates the compressed data useful for decoding the rectangular area, denoted Rect(Z,Z'), encompassing the areas Z(x,y,w,h) and Z' (x',y',w',h'). Such an encompassing rectangular area is illustrated in FIG. 7. The coordinates and size of this encompassing area are given by:

$$\text{Rect}(Z,Z') = [\min(x,x'), \min(y,y'), \max(x+w, x'+w'), \max(y+h, y'+h')]$$

In this case, the display window of the client displays a fixed background and the area displayed inside (the required area Z of FIG. 3 is strictly included in the display window F). In this case, at step E513 there are calculated on the one hand the video data to be transmitted inside the area Z', and on the other hand the data belonging to the "uncovered" area, that is to say the part of the display window previously occupied by the area Z in the previously displayed image, and which it is necessary to refresh.

At the following step E514, the data determined previously are transmitted to the client in the appropriate format (here JPIP).

This step is followed by step E516, where it is checked whether the previously processed image $I_{n'}$ is the last image of the response to be transmitted to the client. If this is not the last image, this step is followed by step E518, where the index of the current image to be processed is updated according to the sampling factor of the sequence SF, in order then to return to step E504, already described.

If the response to test E516 is positive, then step E519 makes provision for transmitting an end of response message to the client, thus terminating the response. Finally, the algorithm ends (E520).

Figure 6:
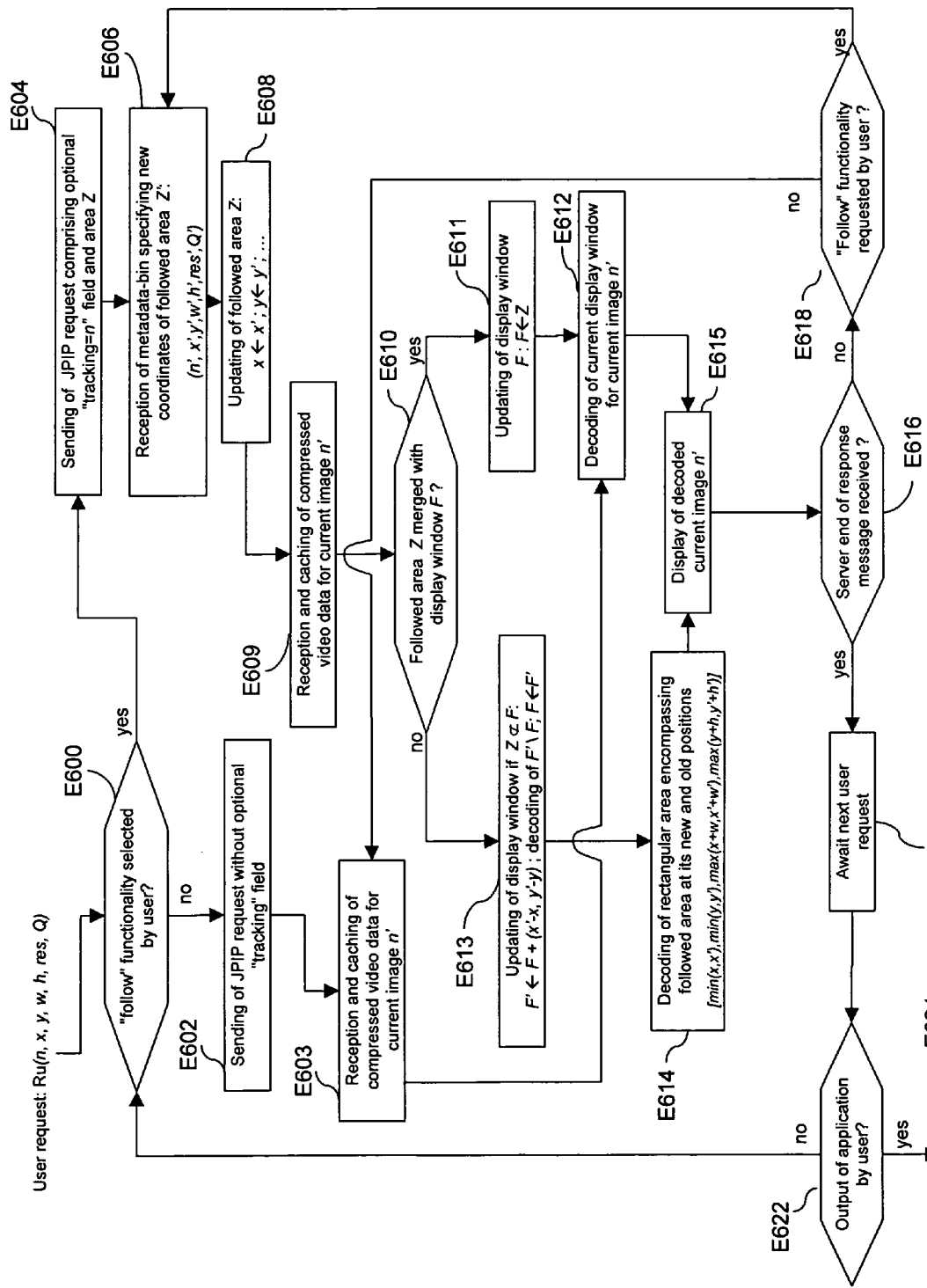
FIG. 6 depicts an example of a reception algorithm according to the invention implemented by the client device.

FIG. 6 describes an embodiment of the algorithm used by the client device for performing the automatic following of an image area, which is applied indifferently to the "real time video" mode or "video on demand" mode.

The algorithm begins following a request from the user, obtained by means of a graphical interface enabling him to navigate in the sequence of images, and to select therefrom sub-parts, to specify their resolution and quality and also, according to the present invention, to request the following of one of these sub-parts, by means of a button to be clicked on or a command by means of the mouse 211 or keyboard 210. Then the index of the current image n and a user request, specifying a display window by its coordinates (x,y), its size (w,h), its resolution res and its quality level Q, are then available at the input of the algorithm. The first step of the algorithm according to a preferred embodiment of the invention is a test E600 evaluating whether the area "follow" option has been activated. If the response is negative, the remainder takes place conventionally by a step E602 of sending a request according to the JPIP protocol for requesting image data corresponding to the display window specified by the user. This request is followed by the step E603 of receiving and storing data. Step E603 is followed by decoding and display steps, described later with reference to steps E612 and E615.

If the response at test E600 is positive, the following step is step E604, of formulation and sending of a request of the JPIP type comprising an optional field "tracking=n", intended to indicate to the server the "follow" mode according to the invention.

A JPIP request of this type, based on the http protocol, can for example take the following form:

GET/fcgi-bin/JpipServer.exe? target=sequence.mj2 &fsiz=2048,1876 &rsiz=512,512 &roff=113, 237&layers=6&context=mj2t<1+now>&tracking=69

This request specifies the reference of the sequence "sequence.mj2". The field fsiz indicates the resolution of the image (represented by the size H=2048, W=1876), the field rsiz indicates the size (height h=512, width w=512) of the display window requested and the field roff indicates the coordinates (x axis x=113, y axis y=237) of the display window requested. The field layers indicates the number of quality layers requested, equal to 6 in the example.

The additional field "tracking=69" is added with respect to the JPIP standard in order to achieve the functionality of the invention. This field indicates that a following is required by the user and that the initial coordinates of the area followed are defined in the image of index 69. In the case of the above request, the area to be followed (Z) is merged with the display window (F) of the user. Where the area to be followed is strictly included in the display window then supplementary optional fields are necessary for specifying its coordinates. They may for example take the following form:

tracking=69<135,264:327,179>

The values (135,264) indicate the abscissa and ordinate of the origin of the area followed in the image and the pair (327,179) its width and size. It should be noted that the area to be followed must be included in the display window. If such is not the case, the server considers the intersection between the specified area to be followed and the display window. If finally this intersection is null, the field tracking is non-valid and ignored by the server.

The request thus made is sent to the server.

Next, at step E606, in the preferred embodiment of the invention, the client receives from the server the message sent by the latter at step E510, containing metadata indicating the new coordinates of the area followed by the server: the index of the corresponding image n', its coordinates (x',y'), its size (h',w') and its resolution res' and the quality level Q'.

The client then updates his followed area Z with the new coordinates received (step E608).

As explained above (with reference to FIG. 3), it is possible to envisage two cases: either the display window on the client device is merged with the area followed, or the area followed is inside the display window. In both cases, it is necessary to update the size and position of the area followed, so that the client knows which image portion he must decode and display.

Finally, in a variant, the metadata are not received (step E606 is omitted) and then step E608 is implemented after calculation of the new coordinates (x',y') of the followed area Z from the indices of the elementary coding entities (precincts) received. At this step, the area followed Z is allocated the same coordinates as the area Z' specified by the metadata box decoded at step E606.

Step E608 is followed by step E609, of reception and storage in memory ("caching") of the compressed image data belonging to the image $I_{n'}$, which are necessary for responding to the request made at step E604. These data received are the compressed data sent by the server at step E514.

Next, at step E610, a test is carried out in order to determine whether the mode where the followed area Z is merged with the display window F applies. In the affirmative, the display window F is updated by allocating to it the same coordinates as the followed area Z (E611).

The data thus received are next decoded (step E612) according to the JPEG2000 format, in order then to be able to be displayed in the display window (step E615).

Returning to test E610, if the test is negative, then step E613 is passed to. This step makes provision for updating the display window F if the new area followed is no longer inside the display window. This updating consists of calculating the new display window F' by adding respectively the movements (x'-x) and (y'-y) to the abscissa and ordinate of the old window F. In addition, the movement of the display window gives rise to the appearance of an uncovered area on the screen. This uncovered area, denoted F'/F, is decoded.

Next, at step E614, the new followed area Z' is decoded, as well as the uncovered image portion resulting from the movement of the followed area. For this purpose a calculation is made of the rectangular area encompassing the followed area at its old position Z and the followed area at its new position Z'. As explained before with reference to step E513, the rectangular area encompassing the whole of these two areas is denoted Rect(Z,Z'), and its coordinates are given by [min(x, x'),min(y,y'),max(x+w,x'+w'),max(y+h,y'+h')].

FIG. 7, described subsequently, illustrates on a visual example the relative positions of the areas Z and Z', as well as the rectangle Rect(Z, Z') encompassing them.

The following step E615 consists of the display of the area or areas decoded during the previous steps.

Next, at step E616, a test is carried out in order to check whether the message received from the server contains a field indicating that the JPIP response from the server has been processed in its entirety. If such is the case, the algorithm passes to step E620 awaiting a future user request. This step is followed by step E622, which tests whether the user has requested an output from the software for navigating in a sequence of images. If the response is positive, the algorithm ends at step E624. Otherwise the algorithm returns to step E600, which processes the new request from the user.

Returning to test E616, if the test indicates that the request has not been entirely processed, and therefore that there remain data to be received and displayed, the method passes to step E618, which tests whether the functionality "follow" is active for the request currently being processed. In the case of a positive response, the algorithm resumes at step E606 in order to receive the characteristics of the new area to be displayed. In the case of a negative response, step E603 and the following steps of reception and decoding are once again executed.

FIG. 7 illustrates in an example the relative positions of the followed area before and after updating by the server. The rectangle designated by $I_{n'}$ represents in its entirety the image of index n' transmitted from the server S to the client C in FIG. 1. FIG. 7 also illustrates the followed area Z before modification of its coordinates by the server (step E506), as well as the new area Z' corresponding to the followed area after modification of its coordinates, according to the movement contained in the sequence, by the server. Finally, the rectangle denoted Rect(Z,Z'), introduced previously with reference to steps E513 and E614, corresponds to the rectangular area exactly encompassing the two rectangles Z and Z'. As explained with reference to step E513, the transmission of the JPEG2000 data contributing to this area Rect(Z,Z') is necessary for the client, in the embodiment where the followed area Z is situated inside the display window F of the user, also illustrated in FIG. 7.

The invention was described in the previous examples with respect to Motion-JPEG2000 compression format, but is not restricted to it.

It can be used, in another embodiment, using a video coding standard like H.264 and its scalable extension called SVC (Scalable Video Coding) which is currently under standardization process.

According to H.264 standard, an image can be divided into "slices", which are defined as groups of blocks referred to as "macroblocks" in the standard. The slices allow the access to spatial subparts of the images of the video. The slices are coded independently, and therefore their syntax elements can be parsed from the H.264 bitstream and the image samples of the image area represented by the slice can be decoded without use of data of other slices.

"Flexible Macroblock Ordering" (FMO) feature has been introduced in H.264. This feature enables to modify the way images are divided into slices and macroblocks by using the concept of "slice groups". Each slice group is a set of macroblocks defined by a macroblock to slice group map, which is specified by the content of the image parameter set and some information of slice headers. The macroblock to slice group map consists of a slice group identification number for each macroblock in the image, specifying which slice group the associated macroblock belongs to. Each slice group can be divided into one or more slices, such that a slice is a sequence of macroblocks within the same slice group that is processed in the order of raster scan within the set of macroblocks of a particular slice group.

Using FMO, an image can be split into many macroblock patterns such as interleaved slices. In particular, a spatial area of interest and a background area can be defined using two slice groups.

SVC is an extension of H.264 aiming at additional scalability to the current H.264 standard, namely spatial, temporal and quality scalability, which also uses slices and slice groups.

In an alternative embodiment of the invention, it is possible to build slice groups according to the spatial area determined with respect to the specified area (step 506 of FIG. 5): one slice group representing the determined spatial area to be transmitted, and another one representing the background. According to that embodiment, the invention makes it possible to build slice groups for each image according to the movement of the tracked object as illustrated in FIG. 4. By using the "Z" window size, it is easy to build a corresponding Slice Group 1 corresponding to the object and a Slice Group 0 corresponding to the background. Then during the transmission of data, as slices can be decoded independently, only slices corresponding to the Slice Group 1 will be transmitted and decoded by the client to display the object.

In still another alternative embodiment, each image may be divided into a plurality of small size slice groups each having substantially the same size (a non-limiting example of such a small size slice group is a set of 3×3 macroblocks). Thus, according to that embodiment, the invention makes it possible to use such small size slice groups surrounding the determined spatial area to be transmitted to the client according to the invention. That variant offers very simple implementation, since there is no new definition (image per image) of the different slice groups: a fixed grid of slice groups may be predefined. Next, the "Z" window may be projected on the predefined grid of slice groups and only slices corresponding to the slice groups intersecting the determined spatial area are transmitted.

Hence, according to the invention, by using the SVC extension of H.264 and its scalable features, the slice group defining the coded data surrounding the tracked object can be easily identified in the different resolutions included into the multi-layer SVC bitstream.

It is to be noted that the use of metadata to define the correspondence between the slice and the object as described previously is not necessary, but it is rather an optional additional feature. The content of the slice header and other information contained in the image parameter set are sufficient to identify each slice and its associated position within the image.

The invention claimed is:

1. A method of transmitting a plurality of images in a sequence of digital images between a server device that includes a microprocessor and a client device connected by a communication network, the plurality of images being coded according to a format allowing access to a plurality of spatial sub-parts, the image transmitting method comprising steps of:

receiving a follow request specifying a spatial area to be followed belonging to an image in the sequence of digital images, the image having been previously received by the client device, the follow request including a predefined field specifying at least an index of the image in the sequence of digital images to which the spatial area to be followed belongs, the spatial area to be followed being positioned at any spatial position of the image;

determining a following image in the sequence of digital images to be sent to the client device;

determining a position of a spatial area in the following image corresponding to the spatial area to be followed specified by the follow request, according to an estimated movement in the sequence of digital images; and sending to the client device information specifying the determined position of the spatial area in the following image and at least some image data of the spatial area in the following image, wherein at least one of the above steps is performed, at least in part, by the microprocessor.

2. The method according to claim 1, wherein the spatial area to be followed specified by the follow request is a rectangular area defined by a size and a position of the rectangular area.

3. The method according to claim 2, wherein the follow request further specifies a size and a position of a rectangular display window.

4. The method according to claim 3, wherein the spatial area to be followed specified by the follow request is identical to the rectangular display window.

5. The method according to claim 3, wherein a size and a position of the spatial area to be followed are specified in the predefined field of the follow request, the spatial area to be followed being included in the rectangular display window.

6. The method according to claim 5, wherein the sending includes sending to the client device supplementary image data corresponding to at least a vicinity of the spatial area in the following image.

7. The method according to claim 2, wherein the follow request further specifies an interval of images in the sequence of digital images for which following must be performed or a time duration for which the following must be performed.

8. The method according to claim 1, wherein the estimated movement in the sequence of digital images is represented by a plurality of movement vectors matching a plurality of spatial blocks between at least a first image and at least a second image in the sequence of digital images, the plurality of blocks being of a predetermined size, the plurality of movement vectors being calculated in advance and being stored by the server device.

9. The method according to claim 1, wherein the estimated movement in the sequence of digital images is represented by a plurality of movement vectors matching a plurality of spatial blocks between at least a first image and at least a second image in the sequence of digital images, the plurality of blocks being of a size depending on the spatial area specified in the follow request, the plurality of movement vectors being calculated at a time of capturing the sequence of digital images.

10. The method according to claim 1, wherein information specifying a size of the spatial area in the following image is transmitted to the client device prior to the sending of the information specifying the position of the spatial area in the following image and the at least some image data of the spatial area in the following image.

11. The method according to claim 10, wherein the information specifying the size of the spatial area in the following image is transmitted as metadata.

12. The method according to claim 1, wherein the plurality of images in the sequence of digital images is coded according to a Motion-JPEG2000 format and the at least some image data are sent according to a JPEG2000 Interactive Protocol (JPIP).

13. A non-transitory computer-readable storage medium storing computer-executable instructions that, when executed by a computer, cause the computer to perform the method according to claim 1.

14. A device for transmitting a plurality of images in a sequence of digital images between a server device and a client device connected by a communication network, the plurality of images being coded according to a format allowing access to a plurality of spatial sub-parts, the device comprising:

a reception unit that receives a follow request specifying a spatial area belonging to an image in the sequence of digital images previously received by the client device, the follow request including a predefined field specifying at least an index of the image in the sequence of digital images to which the spatial area to be followed belongs, the spatial area to be followed being positioned at any spatial position of the image;

a first determination unit that determines a following image to be sent in the sequence of digital images;

a second determination unit that determines a position of an area in the following image to be sent corresponding to the area to be followed specified by the follow request, according to an estimated movement in the sequence of digital images; and a sending unit that sends to the client device information specifying the determined position of the spatial area in the following image and at least some image data of the area determined by the second determination unit.

15. The device according to claim 14, wherein the reception unit extracts from the follow request a predefined field specifying an index of the image in the sequence of digital images to which the image to be followed belongs.

16. The device according to claim 15, wherein the reception unit extracts from the follow request a size and a position of a rectangular display window of the client device.

17. The device according to claim 15, wherein the reception unit extracts a size and a position of the spatial area to be followed from the follow request.

18. The device according to claim 17, wherein the sending unit sends to the client device supplementary image data corresponding to at least one vicinity of the spatial area determined by the second determination unit.

19. The device according to claim 15, wherein the reception unit extracts from the follow request an interval of images of the sequence of digital images for which a follow mode must be applied or a follow time duration.

20. The device according to claim 14, further comprising a calculation and storage unit that calculates and stores a plurality of movement vectors specifying a plurality of spatial blocks of a predetermined size.

21. The device according to claim 14, further comprising a calculation unit that calculates, when the sequence of digital images is captured, a plurality of movement vectors on a plurality of spatial blocks with a size depending on the spatial area specified by the follow request.

22. The device according to claim 14, wherein the sending unit sends to the client device position information specifying the area in the following image to be sent determined by the second determination unit.

23. The device according to claim 22, wherein the position information is transmitted as metadata.

* * * * *